United States Patent [19]

Chilcote et al.

[11] 4,292,281

[45] Sep. 29, 1981

[54] SELECTIVE LEACHING OF CHLORIDE FROM COPPER OXIDE MINERALS

[75] Inventors: Dennis D. Chilcote, Hibbing; Donald J. Kaczyski, Pengilly, both of Minn.

[73] Assignee: The Hanna Mining Company, Cleveland, Ohio

[21] Appl. No.: 169,179

[22] Filed: Jul. 15, 1980

[51] Int. Cl.³ .................................................. C01G 3/02
[52] U.S. Cl. ..................................... 423/27; 423/604; 75/1 R
[58] Field of Search ............... 423/27, 604; 75/101 R, 75/117, 1 R

[56] References Cited

U.S. PATENT DOCUMENTS 725,948  4/1903  Ellis .................................... 75/101 R
2,970,096  1/1961  Horton .............................. 75/101 R

*Primary Examiner*—Brian E. Hearn
*Attorney, Agent, or Firm*—Maky, Renner, Otto & Boisselle

[57] ABSTRACT

A method for extracting chloride ions from copper-hydroxy-chloride containing copper oxide ore comprising the steps of (a) contacting said ore with an aqueous solution of the basic salt of a Group I-A or Group II-A metal in a leaching stage to extract chloride ions from said ore and dissolve said chloride ions in said solution;

(b) removing part of said solution from the mixture of ore and solution as a bleed stream for chloride disposal; and (c) separating said ore from the remainder of said solution.

30 Claims, 3 Drawing Figures

SELECTIVE LEACHING OF CHLORIDE FROM COPPER OXIDE MINERALS

BACKGROUND OF THE INVENTION

This invention relates generally to a process of leaching chloride ions from ores containing copper as oxides. More particularly, the invention relates to a process for leaching chloride ions from ores containing atacamite/paratacamite utilizing an aqueous solution of the basic salt of a Group I-A or Group II-A metal.

Copper minerals in the oxidized zone of porphyry copper deposits are categorized broadly as copper "oxides". These oxides include atacamite/paratacamite $[Cu_2(OH)_3Cl]$, azurite/malachite $[Cu_3(CO_3)_2(OH)_2/Cu_2(CO_3)(OH)_2]$, chrysocolla $[CuSiO_3.nH_2O]$, cuprite $[Cu_2O]$, etc. The copper minerals in the underlying sulfide rich and primary sulfide zones include chalcocite $[Cu_2S]$, chalcopyrite $[CuFeS_2]$, and bornite $[Cu_5FeS_4]$.

The alteration of atacamite by KOH solution to hydrous cupric oxide is reported in "The System of Mineralogy", Charles Palache et al., John Wiley & Sons, Inc., Volume II, 1951 at page 72, citing Chumanov, J. Russ. Phys. Chem. Society, 47, 1268 (1915). This proposal, however, has not found commercial acceptance.

SUMMARY OF THE INVENTION

It has now been discovered that chloride can be effectively leached to commercially acceptable levels from copper-hydroxy-chloride containing copper ore by contacting such ore with an aqueous solution of the basic salt of a Group I-A or Group II-A metal of the Periodic Table, the molar ratio of the anionic portion of said salt to the chloride ions in said ore being at least about 1:1 when the valence of the anionic portion is minus one (e.g., $OH^-$, $HCO_3^-$) and at least about 1:2 when the valence of the anionic portion is minus two (e.g., $CO_3^=$), and separating the substantially chloride free copper oxide from the leaching solution with a series of liquid-solid separation techniques as discussed hereinafter. Broadly stated the invention contemplates a method for extracting chloride ions from copper-hydroxychloride containing copper oxide ore comprising the steps of (a) contacting said ore with an aqueous solution of the basic salt of a Group I-A or Group II-A metal in a leaching stage to extract chloride ions from said ore and dissolve said chloride ions in said solution; (b) removing part of said solution from the mixture of ore and solution as a bleed stream for chloride disposal; and (c) separating said ore from the remainder of said solution.

In a preferred embodiment, the invention contemplates a method for leaching chloride from copper oxide ore wherein at least part of the copper is present as atacamite/paratacamite comprising the steps of (a) contacting copper-hydroxy-chloride containing copper ore with an aqueous leaching solution of the basic salt of sodium, potassium, calcium or magnesium in a leaching stage, the anionic portion of said salt being hydroxyl, carbonate or hydrogen carbonate, the molar ratio of said anionic portion of said salt to the chloride ions in said ore being in the range of about 2:1 to about 1:1 when hydroxyl or hydrogen carbonate is used and about 1:1 to about 1:2 when carbonate is used, said ore and solution remaining in contact in said leaching stage for about five minutes to about ten hours, the temperature of said solution being in the range of about 20° C. to about 100° C.; (b) removing said ore and solution from said leaching stage in the form of a slurry and introducing said slurry into a thickener wherein part of the liquid is removed from said slurry as a bleed stream for chloride disposal; (c) removing the remaining slurry from said thickener; (d) washing said remaining slurry; (e) filtering the washed slurry in a filter stage wherein particulate ore is separated from said slurry; and (f) introducing the filtrate separated from the particulate ore in said filter stage into said leaching stage. The process of the method of the invention can be operated on a continuous or a batch basis.

DETAILED DESCRIPTION OF THE PREFERRED EMBODIMENT

Figure 1:
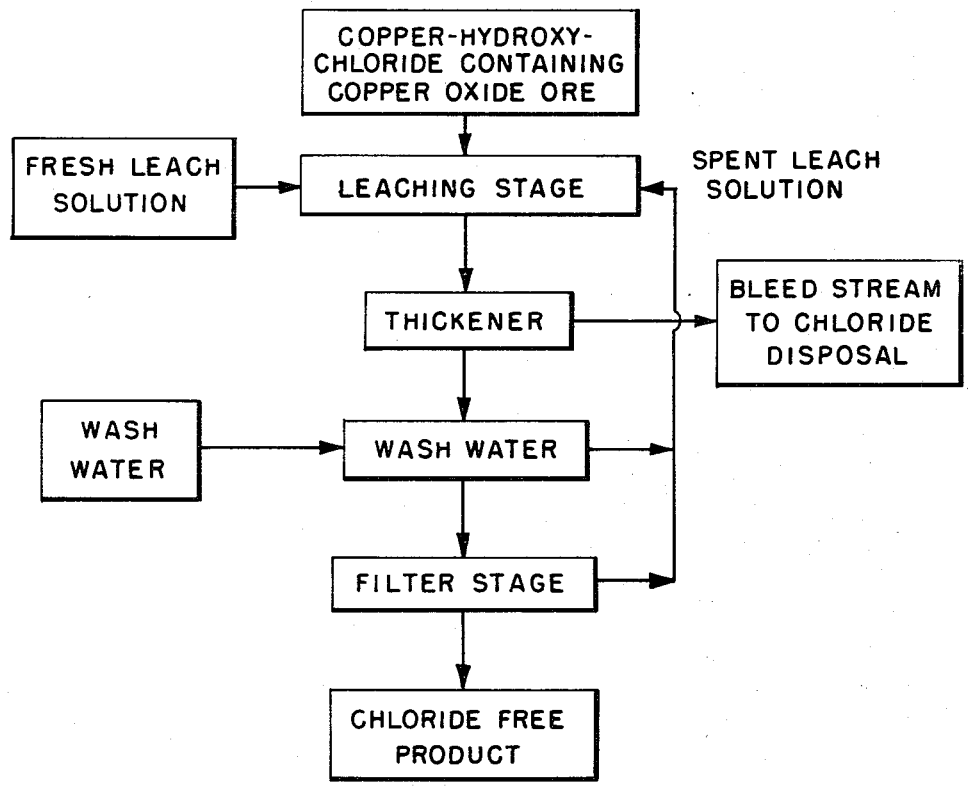
FIG. 1 is a schematic flow diagram illustrating a preferred embodiment of the procedure of the present invention for selectively leaching copper oxide minerals.

Further features and advantages of the invention will be apparent from the detailed description of the preferred embodiment herein set forth.

The copper-containing ores which are treated in accordance with the method of the invention are the ores broadly characterized as copper oxide ores, and more particularly, are copper-hydroxy-chloride containing ores. Such ores include, for example, ores wherein a portion of the copper is present as atacamite/paratacamite which is generally represented by the formula $Cu_2(OH)_3Cl$. Two ore samples from Arizona which can be treated with the method of the present invention have been analyzed and the results of the analysis are reported below in Table I.

TABLE I

| | Percent Weight Analysis | | | | |
|---|---|---|---|---|---|
| Ore Sample No. | Total Copper | Oxide Copper | Sulfide Copper | Cl | S |
| 1 | 1.77 | 1.67 | 0.10 | 0.41 | 0.05 |
| 2 | 1.54 | 1.17 | 0.37 | 0.22 | 0.30 |

Approximately 80% of the copper in Ore Sample No. 1 occurs as atacamite/paratacamite. The balance of the copper mineralization in Ore Sample No. 1 is chrysocolla, cuprite, native copper, copper pitch, copper montmorillonite and various sulfides. Approximately 50% of the copper present in Ore Sample No. 2 is present as atacamite/paratacamite, the balance of the copper mineralization being in the form of chrysocolla, cuprite, native copper, copper montmorillonite, copper pitch and copper sulfides, principally chalcocite.

The starting material for the process of the invention (i.e., the ore to be leached) is particulate ore that can be in the form of ground solids, a slurry of ground solids, or a mineral concentrate such as, for example, a flotation concentrate. The methods, procedures and apparatus used to produce such mineral concentrates are entirely conventional in structure and operation and, being well known to those skilled in the art, need not further be described. The particulate ore is preferably made up from an ore which has been comminuted by grinding in a grinding mill of a standard type where the ore is mixed with water and ground to desirable particle size. Generally, the grinding mill will contain forged steel balls to produce a preferred particle size of approximately 97% passing through a 100 mesh sieve. Conditioning agents may be added to the grinding mill prior to the grinding of the crude ore. The amount of water contained in the grinding mill may be varied, depending on the desired solid content of the slurry. Solid content from about 60% to about 70% is preferred in the grinding operation. The slurry obtained in this manner may be used directly or may be filtered and dried to ease handling. If filtered, the residue may be repulped with water.

As a particular feature of the invention, chloride ions are leached from the copper-hydroxy-chloride containing copper oxide starting material by contacting the starting material with a leach solution comprising an aqueous solution of a basic salt of a Group I-A or Group II-A metal of the Periodic Table. The anionic portion of the salt is preferably hydroxyl, carbonate, or hydrogen carbonate. For purposes of this invention, the preferred leaching solutions are prepared from the alkali hydroxides. Preferred alkaline-earth metals are calcium and magnesium. The most preferred leaching solutions of the invention are made from solutions containing sodium or potassium as the metal.

In the process of the present invention, chloride ions are leached from the starting material and dissolved in the leaching solution. The leaching solution is then separated from the remaining solids in accordance with the techniques hereinafter discussed. The leaching of atacamite/paratacamite with a metal hydroxide, for example, appears to follow the formula:

$$n\ Cu_2(OH)_3Cl + Me(OH)_n \rightarrow 2nCu(OH)_2 + MeCl_n$$

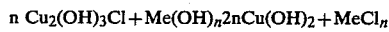

wherein

Me is Li, Na, K, Rb, Cs, Be, Mg, Ca, Sr or Ba; and n is the number 1 or 2 such that the valence requirements of OH to Me is satisfied.

The molar ratio of the anionic portion of the basic salt to the chloride ions in the starting material should be at least about 1:1 when the valence of the anionic portion is minus one (e.g., OH-, $HCO_3$—) and at least about 1:2 when the valence of the anionic portion is minus two (e.g., $CO_3$=). Under various advantageous conditions the molar ratio will range from about 5:1 to about 1:1, preferably about 2:1 to about 1:1, for solutions employing a basic salt with an anionic portion of a minus one valence. The molar ratio will range from about 5:2 to about 1:2, preferably about 1:1 to about 1:2 when a basic salt with anionic portion of a minus two valence is employed in the leaching solution.

The temperature of the leaching solution is in the range of about 20° C. to about 100° C., preferably about 40° C. to about 60° C. The leaching solution and the starting material are brought into contact for a sufficient period of time to effect a desired level of extraction of chloride ions from the starting material. The leach time will generally vary from about 5 minutes to about 10 hours, preferably about 1 to about 3 hours. If processes are employed using more than one leaching stage (as discussed below), the temperature of the solution in each stage will be in the range of about 20° C. to about 100° C., preferably about 40° C. to about 60° C., and the residence time of the starting material in each stage will have an average in the range of about 5 minutes to about 10 hours, preferably about 1 to about 3 hours.

Figure 2:
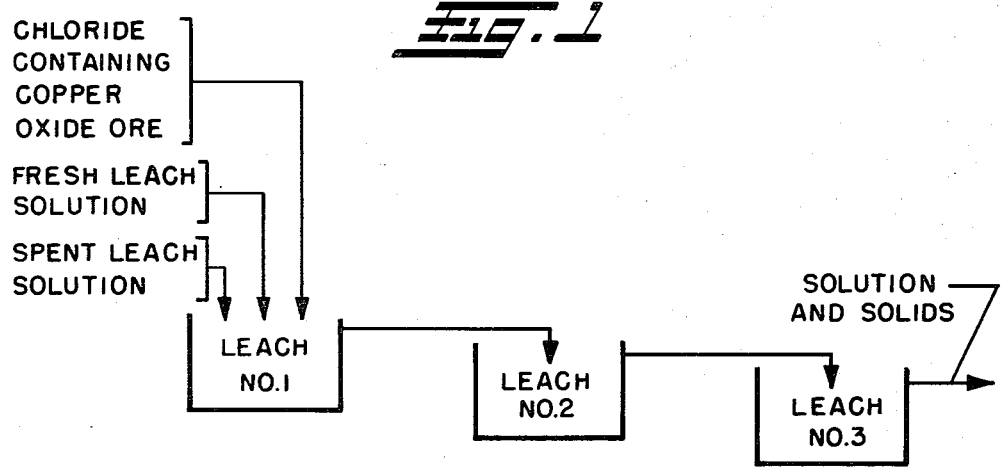
FIG. 2 is a schematic flow diagram of a leaching stage used in accordance with the present invention comprising a plurality of leaching vessels.

FIG. 1 illustrates a flow sheet of a preferred form of the process of the present invention. Referring to FIG. 1, the starting material and the leach solution are brought into contact in the leaching stage. Spent leach solution (discussed hereinafter) is also brought into contact with the starting material in the leaching stage. The leaching stage may consist of a single leach vessel or tank, or a series of leach vessels (FIG. 2). The starting material and leach solution (both fresh and spent) are contacted for a sufficient period of time and under appropriate conditions (as discussed above) to effect a desired transfer of chloride ions from the starting material to the solution. Agitation may be used to enhance the leaching process.

In a particularly advantageous embodiment, a series of leaching vessels are used, as depicted in FIG. 2. The starting material, fresh leach solution and spent leach solution are preferably brought into contact in the first leach vessel, then advanced to a second vessel and then subsequently to succeeding vessels. An aqueous mixture comprising a solution containing chloride ions and solids of substantially chloride-free copper minerals are removed from the last vessel. An advantage of using a series of leach vessels is that short circuiting of the spent leach solution is avoided or at least minimized.

The solution and solids from the leaching stage are then advanced to a thickener wherein part of the solution or liquor is removed or decanted from the solids and remaining solution. The solution removed or decanted from the thickener preferably comprises a bleed stream for removing chloride from the system. The thickener may comprise any well known solid-liquid separation device or system such as, for example, a settling tank, a settling cone or a mechanical continuous thickener with a sludge or thickened slurry raking arm. The settling tank consists of a tank with a feed inlet at the top, a slurry discharge at the bottom and a swing siphon or suitable draw-off device on the tank wall. After a predetermined time, which depends on the settling characteristics of the solid particles, supernatant liquor is drawn through the swing siphon or suitable draw-off connection. After the desired volume of liquor is decanted, the thickened slurry is removed through the bottom discharge. The settling cone consists of a conical tank with an apex of about 45° to 60°. It is usually batched but may be made continuous by providing an automatically or manually controlled sludge or slurry metering valve at the apex. A series of settling tanks or settling cones can be used to stagger the fill-settle-withdrawal cycle.

The basic feature of the mechanical continuous thickener is the sludge or thickened slurry collection removal system, which is designed to move the settled material continuously across the tank floor to the discharge point. The tanks for such mechanical thickeners are preferably cylindrical, but can be rectangular. Feed enters the thickener through a central feed well designed to distribute the flow to the basin. A clarified liquor overflows into a launder around the periphery. Solid particles, raked toward the center by a slowly revolving mechanism, enter a central collecting trough or cone and are discharged through a spigot or removed by a sludge or slurry pump.

The slurry of solids and solution is advanced from the thickener to a wash stage which consists of a vessel or a series of vessels wherein wash water is brought into contact with the slurry. The slurry and the wash water may be agitated to enhance the washing process. After a predetermined time agitation, if used, is stopped, the solid particles are allowed to settle and clear supernatant liquor is drawn off and cycled back to the leaching stage as spent leach solution. Alternatively, an agitated tank can be connected in series to a non-agitated tank; the washing process being conducted in the agitated tank and the settling and separation process being conducted in the non-agitated tank. Solids are removed from the wash stage in the form of a slurry and advanced to a filter stage.

In the filter stage, undissolved particulate suspended solids from the wash stage are separated from the solution. The solids comprise copper oxide minerals that are substantially chloride-free. The filtrate separated from the solids in the filter medium is recycled back to the leaching stage as spent leach solution. The filtering step is performed in a filter of any type suitable for separating particulate copper oxide minerals from a liquid medium. Such filters are entirely conventional in structure and operation and, being well known to those skilled in the art, need not be described further.

Alternatively, the slurry of solids and solution can be advanced from the thickener directly to the filter stage, the wash stage thereby being bypassed. Under such circumstances sufficient washing of the solids or filter can be accomplished on the filter. If necessary, however, the filter cake can be repulped with water and filtered again to improve the washing efficiency.

Figure 3:
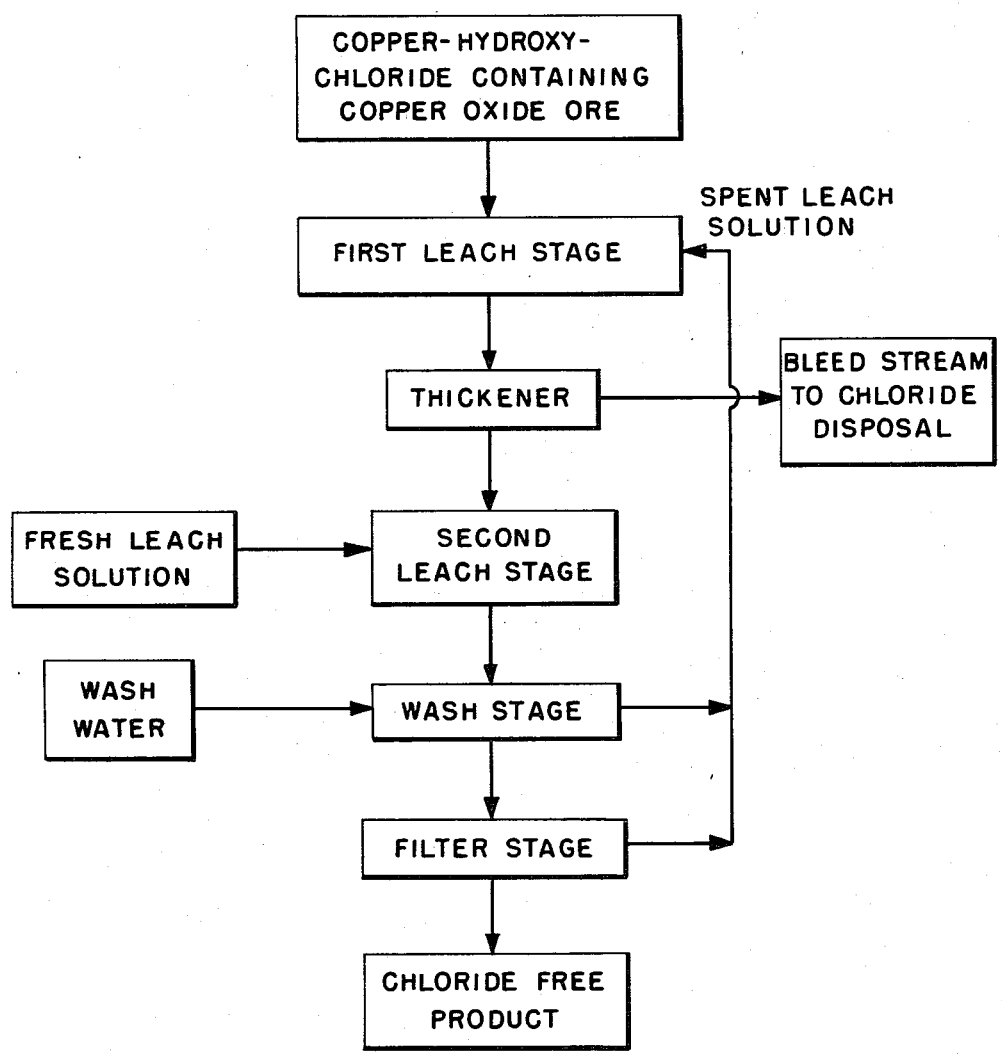
FIG. 3 is a schematic flow diagram illustrating an alternate preferred embodiment of the procedure of the present invention for selectively leaching copper oxide minerals.

FIG. 3 illustrates a flow sheet of an alternate preferred form of the process of the present invention. The process depicted in FIG. 3 is similar to the process depicted in FIG. 1 with the exception that two leaching stages are employed as opposed to a single leaching stage. Referring to FIG. 3, the starting material is introduced into the first leaching stage where it is brought into contact with spent leach solution that is recycled from the wash stage and the filter stage (described hereinafter). The first leach stage may consist of a single leach vessel or a plurality of leach vessels. A plurality of leach vessels is preferred in order to avoid short circuiting of the spent leach solution. The starting material and spent leach solution are brought into contact in the first leaching stage for a sufficient period of time and under appropriate conditions (as discussed above) until a desired level of extraction of chloride ions from the starting material is achieved.

The solution and solids from the first leaching stage are then advanced to a thickener. The thickener is similar in design and operation to the thickener of the embodiment depicted in FIG. 1. The solution decanted or removed from the thickener preferably comprises a bleed stream for removing chloride from the system.

The slurry of solids and solution is advanced from the thickener to a second leaching stage. In the second leaching stage, the slurry is brought into contact with fresh leach solution for a sufficient period of time and under appropriate conditions (as discussed above) to achieve the desired additional level of extraction of chloride ions from the starting material. The second leaching stage, like the first leaching stage, may consist of one leach vessel or a plurality of leach vessels, the latter being preferred. An advantage of using a second leaching stage is that chloride extraction is enhanced and the loss of leaching solution in the bleed stream is minimized. Additional leaching stages can be employed under various advantageous conditions to maximize the levels of chloride extraction with minimum losses of leach solution.

A slurry is advanced from the second leaching stage to the wash stage wherein wash water is mixed with the slurry in a similar manner as with the embodiment depicted in FIG. 1. A supernatant liquor is decanted or removed from the wash stage and recycled to the first leaching stage as spent leach solution. A slurry from the wash stage is advanced to a filter stage wherein the remaining solution is separated from the solids in a similar manner as with the embodiment depicted in FIG. 1 and recycled to the first leaching stage as spent leach solution. The solids removed from the filter stage comprise a substantially chloride-free copper oxide mineral product.

The process of the invention as depicted in FIG. 1 or FIG. 3 can be conducted on a batch or a continuous basis. In either case, the operating parameters of each step of the process must be established within the foregoing limitations to accommodate the particular starting material to be treated. When more than one vessel is used in a leaching stage (FIG. 2) the flow of solids and leaching solution is co-current with each other within the leaching stage. When more than one leaching stage is used (FIG. 3) the flow of solids and leaching solution is counter-current to each other between the leaching stages, but co-current to each other within each leaching stage.

By way of further illustration of the invention, reference may be made to the following specific examples. Unless otherwise indicated, all percentages are by weight.

EXAMPLE 1

Fifty grams of a flotation concentrate rich in atacamite/paratacamite assaying at 9 percent chloride is leached for 4 hours in a 20 grams per liter (gpl) caustic soda solution. The leach temperature is 40° C. and the molar ratio of OH ions in the caustic solution to the Cl ions in the concentrate is 1.5. The chloride concentration in the leach solution at the end of the test is approximately 10 gpl. The residual chloride level in the flotation concentrate is 0.015 percent; 99.9 percent of the chloride is extracted from the concentrate.

EXAMPLE 2

Twenty grams of the flotation concentrate of Example 1 is leached for 3 hours at 22° C. with a 20 gpl caustic soda solution. The molar ratio is 2.0. The initial chloride concentration in the leach solution is 100 gpl. Chloride extraction is 58.2 percent and the chloride concentration in the leach residue is 4.1 percent.

EXAMPLE 3

The procedure of Example 2 is repeated except that the leaching temperature is 60° C. Chloride extraction is 99.6 percent and the chloride concentration in the leach residue is 0.035 percent.

EXAMPLE 4

The flotation concentrate of Example 1 is leached for varying times at 60° C. in a 20 gpl caustic soda solution. Excess caustic is adjusted to a molar ratio of 1.2, and the initial chloride concentration in the leach solution is 50 gpl. Under these conditions, the extractions of chloride from the concentrate with respect to the leach times are: 88.3 percent at 0.5 hour; 92.6 percent at 1.0 hour; 95.7 percent at 2.0 hours; 97.0 percent at 4.0 hours; and 98.1 percent at 6.0 hours.

EXAMPLE 5

The flotation concentrate of Example 1 is leached for 4 hours at 60° C. in a solution of sodium bicarbonate. The molar ratio of $HCO_3$ ions to chloride ions in the flotation concentrate is 2.0. The extraction of chloride from the concentrate is 84.6 percent, and an X-ray analysis of the residue indicates that atacamite is converted to malachite.

EXAMPLE 6

The flotation concentrate of Example 1 is leached for 3 hours at 80° C. in a solution of calcium hydroxide. The molar ratio is 2.0. Total extraction of chloride from the concentrate is 98.2 percent.

EXAMPLE 7

The flotation concentrate of Example 1 is used in a locked-cycle test to simulate a two-stage leach. The leach liquor contains 40 gpl chloride; the molar ratio is 1.2. The leach is carried out at 50° C., with a leach time of 2 hours per stage. The test is conducted by contacting partially leached flotation concentrate with fresh leach solution to complete the leaching of chloride from the leach residue. The partially spent leach liquor is then used to leach fresh flotation concentrate to begin the next cycle. The cycle is repeated 5 times. The chloride assays on the final leach residues from each stage remained relatively constant at 0.03 to 0.06 weight percent. Chloride extraction from the flotation concentrate in each cycle is greater than 99 percent.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

We claim:

1. A method for extracting chloride for copper-hydroxy-chloride containing copper oxide ore comprising the steps of
   (a) contacting said ore with an aqueous solution of the basic salt of a Group I-A Group II-A metal in a leaching stage to extract chloride ions from said ore and dissolve said chloride ions in said solution, said salt including an anionic portion with a valence of minus one or minus two, the molar ratio of said anionic portion to the chloride ions in said ore being in the range of about 5:1 to about 1:1 when the valence of said ionic portion is minus one and about 5:2 to about 1:2 when the valence of said ionic portion is minus two;
   (b) removing part of said solution from the mixture of ore and solution as a bleed stream for chloride disposal; and
   (c) separating said ore from the remainder of said solution.

2. The method of claim 1 wherein said ore comprises atacamite/paratacamite.

3. The method of claims 1 or 2 wherein said salt includes a cationic portion, said cationic portion comprising sodium or potassium.

4. The method of claims 1 or 2 wherein said salt includes a cationic portion, said cationic portion comprising magnesium or calcium.

5. The method of claims 1 or 2 wherein said salt includes an anionic portion, said anionic portion comprising hydroxyl, carbonate or hydrogen carbonate.

6. The method of claims 1 or 2 wherein said ore and said solution are in contact in said leaching stage for about five minutes to about ten hours.

7. The method of claim 6 wherein said ore and said solution are in contact for about one to about three hours.

8. The method of claims 1 or 2 wherein the temperature of said solution in said leaching stage is in the range of about 20° C. to about 100° C.

9. The method of claim 8 wherein the temperature of said solution is in the range of about 40° C. to about 60° C.

10. The method of claim 1 wherein said anionic portion has a valence of minus one and said molar ratio is from about 2:1 to about 1:1.

11. The method of claim 1 wherein said anionic portion has a valence of minus two and said molar ratio is from about 1:1 to about 1:2.

12. The method of claims 1 or 2 wherein said solution comprises sodium hydroxide.

13. The method of claims 1 or 2 with the step of removing said ore and solution from said leaching stage prior to step (b).

14. The method of claim 15 with the step of introducing part of said separated solution into said leaching stage.

15. The method of claim 13 with the step of washing the removed ore and solution subsequent to step (b) but prior to step (c) in a wash stage with water.

16. The method of claim 15 with the step of removing part of said water and solution from said wash stage and introducing said part into said leaching stage.

17. The method of claims 1 or 2 with the steps of removing the ore and solution from said leaching stage and introducing said ore and solution into another leaching stage subsequent to step (b) but prior to step (c).

18. The method of claim 17 with the step of introducing an aqueous solution of the basic salt of a Group I-A or Group II-A metal into said another leaching stage.

19. The method of claim 17 with the step of separating part of the solution removed from said leaching stage from said ore and the remainder of solution removed from said leaching stage and introducing said ore and said remainder of said solution into said another leaching stage.

20. The method of claim 17 with the step of removing said ore and solution from said another leaching stage prior to step (b) and introducing said solution into said leaching stage subsequent to step (b) but prior to step (c).

21. The method of claim 17 with the step of removing said ore and solution from said another leaching stage subsequent to step (b) but prior to step (c) and introducing said solution into said leaching stage.

22. The method of claims 1 or 2 wherein said ore is particulate and about 97% of said particulate ore is small enough to pass through a 100 mesh sieve.

23. The method of claims 1 or 2 wherein said ore is introduced into said leaching stage in the form of a flotation concentrate.

24. A method for leaching chloride from copper oxide ore wherein at least part of the copper is present as atacamite/paratacamite comprising the steps of
(a) contacting copper-hydroxy-chloride containing copper ore with an aqueous leach solution of the basis salt of sodium, potassium, calcium or magnesium in a leaching state, the anionic portion of said salt being hydroxyl, carbonate or hydrogen carbonate, the molar ratio of said anionic portion of said salt to the chloride ions in said ore being in the range of about 2:1 to about 1:1 when hydroxyl or hydrogen carbonate is used and about 1:1 to about 1:2 when carbonate is used, said ore and solution remaining in contact in said leaching stage for about five minutes to about ten hours, the temperature of said solution being in the range of about 20° C. to about 100° C.;
(b) removing said ore and solution from said leaching stage in the form of a slurry and introducing said slurry into a thickener wherein part of the liquor is removed from said slurry as a bleed stream for chloride disposal;
(c) removing the remaining slurry from said thickener;
(d) washing said remaining slurry;
(e) filtering the washed slurry in a filter stage wherein particulate ore is separated from said slurry; and
(f) introducing the filtrate separated from the particulate ore in said filter stage into said leaching stage.

25. The method of claim 24 with the steps of introducing the slurry removed from said thickener in step (c) into another leaching stage prior to step (d), said slurry remaining in said another leaching stage for above five minutes to about ten hours, the temperature of said slurry in said another leaching stage being in the range of about 20° C. to about 100° C., and removing said slurry from said another leaching stage prior to step (d).

26. The method of claim 25 with the step of introducing fresh leach solution into said another leaching stage, said fresh leach solution comprising the basic salt used in step (a).

27. The method of claims 1, 2, 24, 25 or 26 wherein said method is conducted on a batch basis.

28. The method of claims 1, 2, 24, 25 or 26 wherein said method is conducted on a continuous basis.

29. The method of claims 24 or 25 wherein said leaching stage comprises a plurality of leaching vessels.

30. The method of claim 25 wherein said another leaching stage comprises a plurality of leaching vessels.

* * * * *